(12) United States Patent
Kurosawa

(10) Patent No.: US 11,486,827 B2
(45) Date of Patent: Nov. 1, 2022

(54) DROPLET SENSOR

(71) Applicant: Hideo Kurosawa, Kanagawa (JP)

(72) Inventor: Hideo Kurosawa, Kanagawa (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 64 days.

(21) Appl. No.: 17/029,457

(22) Filed: Sep. 23, 2020

(65) Prior Publication Data

US 2021/0096073 A1    Apr. 1, 2021

(30) Foreign Application Priority Data

Sep. 30, 2019  (JP) .............................. JP2019-178498

(51) Int. Cl.
 *G01N 21/552* (2014.01)
 *B60S 1/08* (2006.01)
(52) U.S. Cl.
 CPC .......... *G01N 21/552* (2013.01); *B60S 1/0837* (2013.01); *G01N 2201/0637* (2013.01)
(58) Field of Classification Search
 USPC ....................................................... 356/445
 See application file for complete search history.

(56) References Cited

U.S. PATENT DOCUMENTS

| 2002/0033459 A1* | 3/2002 | Graves | B60S 1/0822 250/573 |
| 2002/0139944 A1* | 10/2002 | Ishino | B60S 1/0822 250/573 |
| 2013/0100453 A1* | 4/2013 | Harrison | G01N 25/68 356/445 |

FOREIGN PATENT DOCUMENTS

| JP | 2009150808 A | * | 7/2009 | ............. G01N 21/47 |
| JP | 2014-211358 | | 11/2014 | |
| JP | 2014-238383 | | 12/2014 | |
| JP | 2019-120567 | | 7/2019 | |
| KR | 20150077595 A | * | 7/2015 | ....... G02F 1/133308 |
| WO | WO-2019130844 A1 | * | 7/2019 | ............. G01N 21/43 |

\* cited by examiner

*Primary Examiner* — Sunghee Y Gray
(74) *Attorney, Agent, or Firm* — IPUSA, PLLC

(57) ABSTRACT

A droplet sensor includes an optical cover having an ellipsoid surface that is a portion of a spheroid, a light source disposed at or in proximity to a first focal point of the ellipsoid surface, and a light detector disposed at or in proximity to a second focal point of the ellipsoid surface. The ellipsoid surface includes an effective detection area configured to reflect light emitted by the light source toward the light detector, and an amount of light reflected by the effective detection area changes in accordance with adhesion of droplets on the ellipsoid surface. The optical cover includes a space having a hemispherical surface, the space being centered at the second focal point. The hemispherical surface includes a transmission scattering surface on a region that receives the light reflected by the effective detection area.

6 Claims, 14 Drawing Sheets

DROPLET SENSOR

CROSS-REFERENCE TO RELATED APPLICATIONS

This application is based on and claims priority to Japanese Patent Application No. 2019-178498, filed Sep. 30, 2019, the entire contents of which are incorporated herein by reference.

BACKGROUND OF THE INVENTION

1. Field of the Invention

The present disclosure relates to a droplet sensor that senses a droplet, such as a raindrop or a waterdrop.

2. Description of the Related Art

An apparatus for detecting raindrops by using a change in reflectance when raindrops adhere to a raindrop detection area of a transparent plate is known (see, for example, Patent Documents 1 and 2). In the apparatus, light emitted by a light emitting element is reflected by a surface of the transparent plate and is received by a light receiver. When raindrops adhere to the rain droplet detection area, the reflectance changes at a boundary of the transparent plate, the amount of received light changes, and the presence of the raindrops is detected.

There is a problem in that it is difficult to manufacture optical elements used in the apparatuses described in Patent Documents 1 and 2 because of the complexity of the shape of the apparatus.

RELATED-ART DOCUMENTS

Patent Documents

Patent Document 1: Japanese Patent No. 6094354
Patent Document 2: Japanese Patent No. 6167799
Patent Document 3: Japanese Laid-open Patent Publication No. 2019-120567

SUMMARY OF THE INVENTION

According to one aspect of embodiments of the present disclosure, a droplet sensor includes an optical cover having an ellipsoid surface that is a portion of a spheroid, a light source disposed at or in proximity to a first focal point of the ellipsoid surface, and a light detector disposed at or in proximity to a second focal point of the ellipsoid surface. The ellipsoid surface includes an effective detection area configured to reflect light emitted by the light source toward the light detector, and an amount of light reflected by the effective detection area changes in accordance with adhesion of droplets on the ellipsoid surface. The optical cover includes a space having a hemispherical surface, the space being centered at the second focal point. The hemispherical surface includes a transmission scattering surface on a region that receives the light reflected by the effective detection area.

DESCRIPTION OF THE EMBODIMENTS

Figure 1:
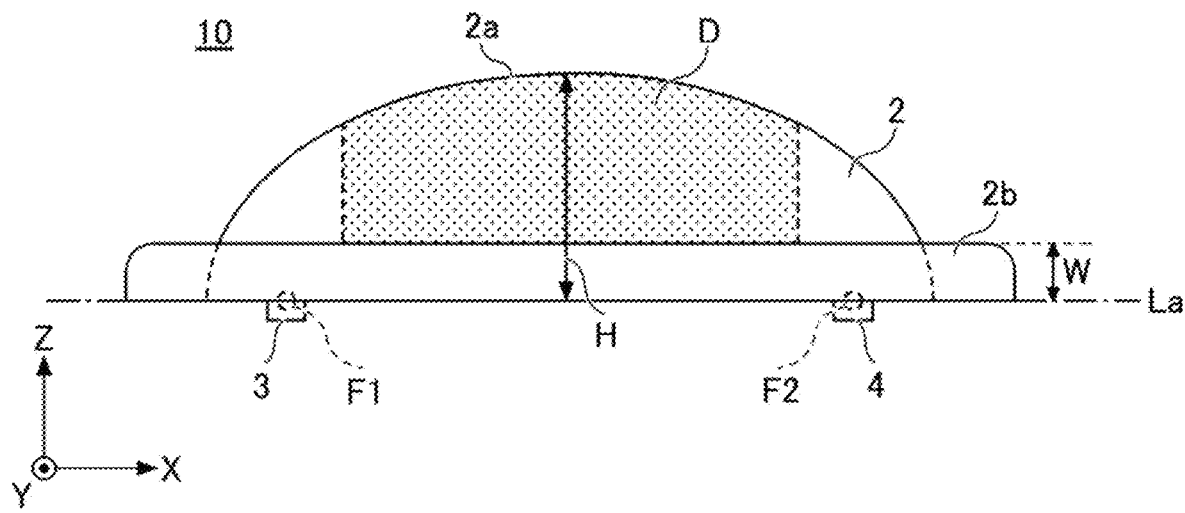
FIG. 1 is a side view of a rain sensor according to a first embodiment.

The present applicant proposes a novel droplet sensor having a simple configuration and that is easily manufactured (see Patent Document 3). The droplet sensor includes, for example, an optical cover having a shape obtained by cutting a spheroid with a plane including a major axis of the spheroid, a light source disposed at a first focal point of the spheroid, and a light detector disposed at a second focal point of the spheroid.

The droplet sensor is not only a simple configuration and easily manufactured, but also achieves a highly sensitive droplet sensor having a large detection area by adjusting the eccentricity of the spheroid to maximize an area that satisfies two conditions (which will be hereinafter referred to as the effective detection area). The two conditions are that a total reflection condition at an interface with gas (e.g., air) is satisfied and a total reflection condition at an interface with liquid (e.g., water) is not satisfied.

The droplet detection sensitivity is expressed as a ratio of the amount of light received by a light detector when the droplets adhere to the effective detection area to the amount of light received by the light detector when the droplets are not adhered. Thus, the droplet detection sensitivity depends on an irradiance distribution of light illuminated from a light source to the effective detection area.

The irradiance on the effective detection area mainly depends on factors of "an emission profile of light emitted by a light source", "the distance from a light source to each area in the effective detection area", and "the incident angle from the light source to each area in the effective detection area".

The irradiance depends on the "emission profile of the light emitted by the light source" because the emission profile of the light emitting element generally has angle dependency, and the irradiance differs depending on the emitting angle.

The irradiance depends on the "distance from the light source to each area in the effective detection area" because the light travels radially centered at a light source, and the irradiance on a plane perpendicular to a light beam becomes smaller in inverse proportion to the square of the distance from the light source.

The irradiance depends on the "incident angle from a light source to each region in the effective detection area" because the irradiance on an irradiated plane decreases in accordance with cos θ as the incident angle increases where θ is the incident angle to the irradiated plane.

In the above-described optical cover, the effective detection area is ellipsoidal and the distance from the light source varies depending on regions in the effective detection area. Thus, even if the emission profile of the light source is homogeneous, the irradiance of the effective detection area surface is non-uniform, and the detection sensitivity is generally non-uniform. Specifically, when the emission profile is homogeneous, a region close to the light source in the effective detection area has a high irradiance and a high detection sensitivity. With respect to this, due to the eccentricity, a region far from the light source in the effective detection area tends to have a low detection sensitivity because the irradiance is low.

It is desirable to provide a droplet sensor that has a uniform detection sensitivity, or permits control of the detection sensitivity.

According to at least one embodiment of the present invention, a droplet sensor that has the uniform detection sensitivity is achieved.

In embodiments of the present invention, the presence of droplets is optically detected based on changes in the reflectance at a boundary surface of an optical cover caused by a difference in the refractive index between the gas and a liquid. Droplet sensors can be applied to the detection of droplets other than raindrops, such as condensation, waterdrops, and ink. In each of the following embodiments, an example of applying a droplet sensor to a rain sensor will be described.

First Embodiment

Figure 2:
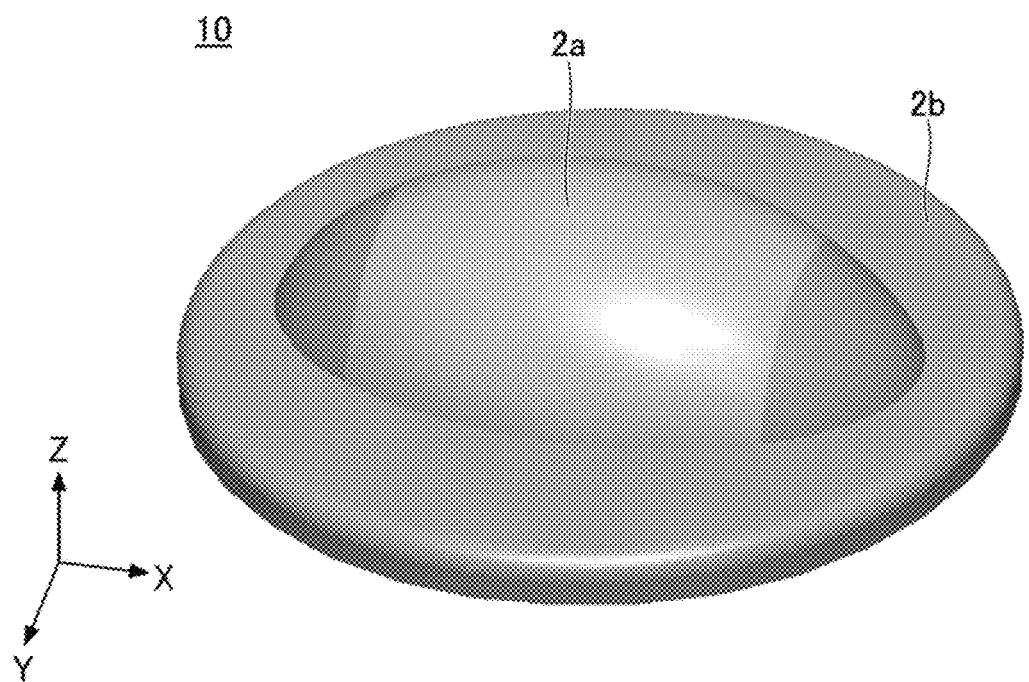
FIG. 2 is a perspective view of the rain sensor according to the first embodiment.

FIG. 1 is a side view of a rain sensor 10 according to a first embodiment. FIG. 2 is a perspective view of the rain sensor 10 according to the first embodiment. The rain sensor 10 detects adhesion of raindrops. From raindrop detection results, for example, the amount of rain per unit time and/or per unit area can be measured.

The rain sensor 10 includes an optical cover 2, a light emitting element 3, and a light receiving element 4. The optical cover 2 includes an ellipsoid surface 2a and a flange 2b. The light emitting element 3 is disposed at or in proximity to a first focal point F1 of the ellipsoid surface 2a. The light receiving element 4 is disposed on or in proximity to a second focal point F2 of the ellipsoid surface 2a. Here, the light emitting element 3 is an example of a light source, and the light receiving element 4 is an example of a light detector.

The optical cover 2 is a solid cover forming a portion of a spheroid and is made of a material that is transparent to a wavelength of light emitted by the light emitting element 3. In the example of FIG. 1, the optical cover 2 has a shape obtained by cutting, in a plane horizontal to the XY plane including a major axis La, a spheroid obtained by rotating an ellipse having a major axis in the X direction and a minor axis in the Y direction around the major axis La. In FIG. 1, for convenience, the height direction of the optical cover 2 is set as the Z direction.

The optical cover 2 may be made of a resin, such as polycarbonate and acrylic, as well as transparent ceramic, glass, high refractive index plastic, and the like.

The flange 2b extends from a lower portion of the optical cover 2 in the XY plane direction, and the planar shape is, for example, circular or elliptical. The planar shape of the flange 2b is not limited to this, and may be a quadrilateral shape or another shape. The flange 2b has a fixed thickness W in the Z direction. The thickness W of the flange 2b is, for example, approximately 25% of the height H of the optical cover 2. The flange 2b functions as a mounting part for fixing the optical cover 2 to a main body, for example. The thickness W of the flange 2b may be 25% or smaller of the height H of the optical cover 2, as long as the strength against the stress applied to fixing can be maintained, that is, for example, the optical cover is not damaged by tightening a screw when the mounting part is screwed to fix the optical cover.

The light emitting element 3 is a light emitting diode that emits, for example, near-infrared light. The light receiving element 4 is, for example, a quantum well light receiving element having sensitivity to light in the near-infrared range. The light emitting element 3 emits light toward the ellipsoid surface 2a of the optical cover 2. The light receiving element 4 receives light that is emitted by the light emitting element 3 and that is reflected by the ellipsoid surface 2a of the optical cover 2. The light emitting element 3 and the light receiving element 4 are mounted on a substrate (which is not illustrated).

A dotted-hatched area D in FIG. 1 is an effective detection area and is included in the ellipsoid surface 2a. The effective detection area D is an area on the ellipsoid surface 2a that totally reflects the light emitted by the light emitting element 3 when the optical cover 2 is surrounded by air. The effective detection area D is shaped such that the total reflection condition is not satisfied only when raindrops adhere. That is, the effective detection area D is a region where the total reflection condition is satisfied at an interface with gas and the total reflection condition is not satisfied at an interface with liquid. The size of the effective detection area D for achieving the above depends on the refractive index of the optical cover 2 and the eccentricity of the ellipsoid surface 2a.

When the optical cover 2 is formed using a resin having a refractive index of 1.57 (e.g., polycarbonate), the range of the incident angle θm of a detectable area in which adhesion of raindrops can be detected is approximately 39.6°<θm<57.9°. In the present embodiment, the eccentricity is set to 0.781 and an area having the range of the incident angle θi that satisfies 44.3°<θi<51.4° is used as the effective detection area D.

The reason why an area having 39.6<θ<44.3 is not used as the effective detection area is that the area having 39.6<θ<44.3 is an area where raindrop detection using the total reflection condition may not be possible due to molding error of the optical cover 2, deformation of the optical cover 2 caused by another factor, such as thermal expansion, and wavelength variation of the optical element.

Because an area outside the effective detection area D (θi<44.3°) includes a detectable area, the light receiving element 4 detects reflected light from the detectable area other than the effective detection area D. Thus, the light receiving element 4 receives the light reflected from the effective detection area D mixed with the light reflected from the detectable area other than the effective detection area D, thereby affecting the rain drop detection result of the effective detection area D. Therefore, by applying a light shielding coating to the outside of the effective detection area D to cause the amount of the reflected light from the detectable area outside of the effective detection area D to be constant, it is possible to accurately detect adhesion of waterdrops in the effective detection area D. Additionally, applying the light shielding coating can prevent external light noise from entering from the outside of the detectable area.

The eccentricity is a value determined by the ratio of the distance from the center of the ellipsoid surface 2a to the focal point to the major axis radius. When the refractive index of the optical cover 2 is 1.57, the area functioning as the detectable area is maximized at an eccentricity of 0.781. The shape of the detectable area is described in detail in the earlier application (Patent Document 3) submitted by the present applicant.

As described above, the flange 2b functions as a mounting part for mounting the optical cover 2 to the main body or the substrate. Because it is almost impossible for the light receiving element 4 to detect light reflected from an area of about 25% or smaller of the height H of the optical cover 2, the area of about 25% or smaller of the height H is used as the flange 2b serving as the mounting part. This is because when a light receiving surface is disposed to an upper side, the light receiving element 4 has a high detection sensitivity to light from an upper direction and has a low detection sensitivity to light from a lateral direction (i.e., from the XY direction). By using the low sensitivity area as the flange, as the rain sensor assuming that droplets are dropped from an upper direction, the detection area contributing to information about adhesion of raindrops is hardly reduced, and there is almost no influence on detecting the presence or absence of drops of raindrops or collecting the amount of raindrops. Therefore, it is possible to form the flange 2b as the mounting part without substantially decreasing the detection sensitivity.

Figure 3:
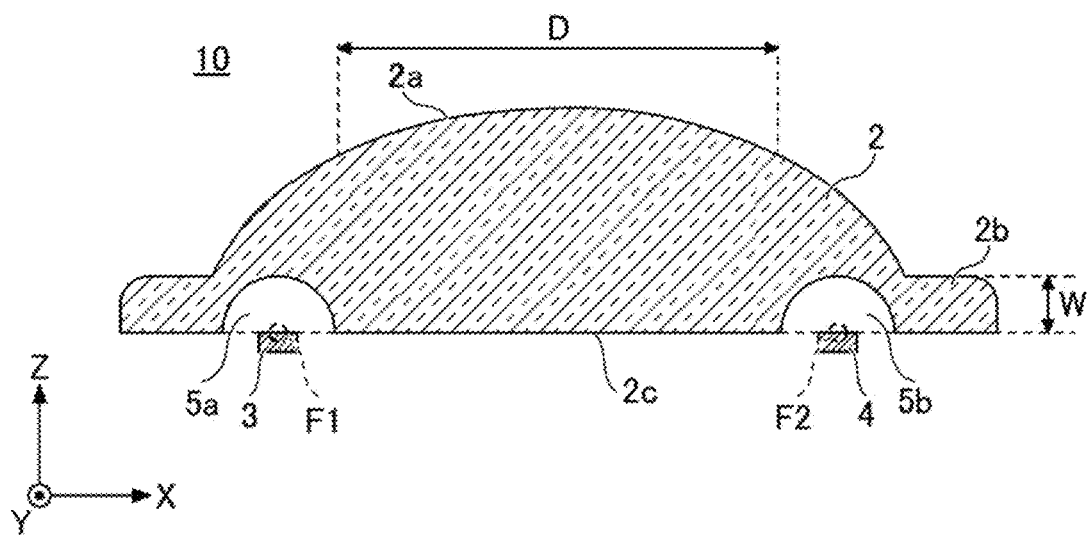
FIG. 3 is a cross-sectional view of the rain sensor.
Figure 4:
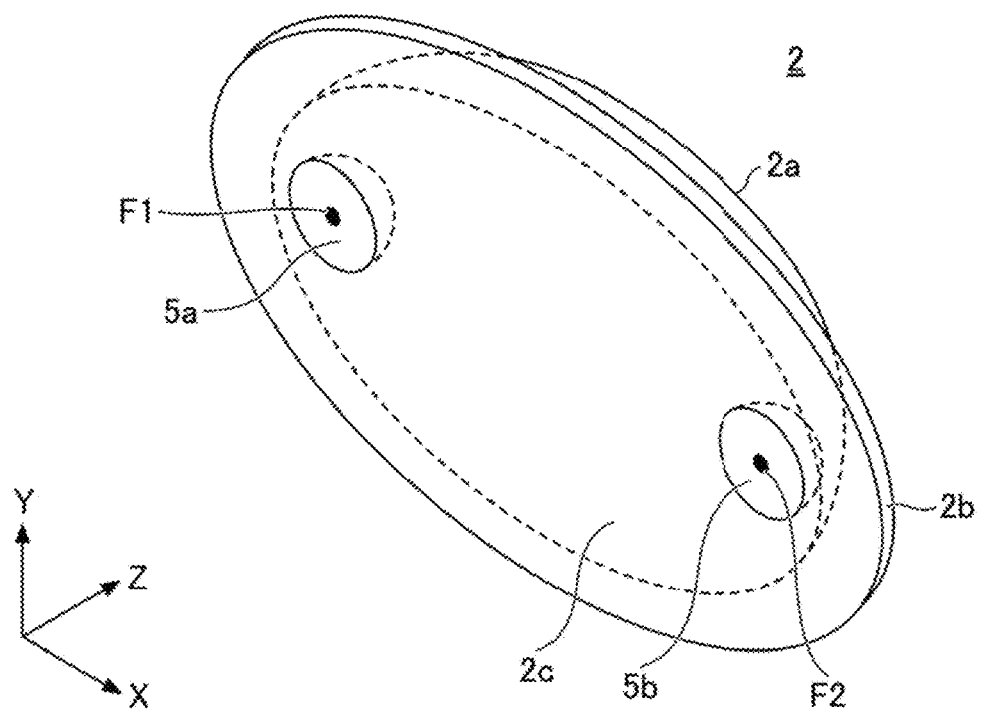
FIG. 4 is a perspective view of an optical cover viewed from a bottom side.

FIG. 3 is a cross-sectional view of the rain sensor 10 cut in the XZ plane including the major axis La. FIG. 4 is a perspective view of the optical cover 2 viewed from the bottom surface 2c side.

As illustrated in FIGS. 3 and 4, a first space 5a and a second space 5b are formed inside the optical cover 2. The first space 5a is a hemispherical space centered around the first focal point F1 at which the light emitting element 3 is disposed, and an interface (i.e., a hemispherical surface) with the optical cover 2 is a transmission specular surface (i.e., a surface that is smooth and does not have irregularities, through which the light passes without scattering). The second space 5b is a hemispherical space centered around the second focal point F2 at which the light receiving element 4 is disposed, and an interface (i.e., a hemispherical surface) with the optical cover 2 has a transmission scattering surface (i.e., a surface that has irregularities and through which light passes with scattering, such as a sand surface) and a transmission specular surface. Details of the interface between the second space 5b and the optical cover 2 will be described later.

In the present embodiment, the radii of the first space 5a and the second space 5b are almost the same as the thickness W of the flange 2b.

As described above, because the first space 5a has a hemispherical surface, the light emitted by the light emitting element 3 enters the inside of the optical cover 2 without being refracted. Similarly, because the second space 5b has a hemispherical surface, light reflected by the ellipsoid surface 2a enters the second space 5b without being refracted (when the second space 5b has the transmission scattering surface, light is scattered at entering the second space 5b, but light at the center of the intensity distribution enters the second space 5b without being refracted). Thus, a rain sensor that uses a basic property of a spheroid, which is a property that light output from one focal point of an ellipse is concentrated at the other focal point, can be achieved.

Figure 5:
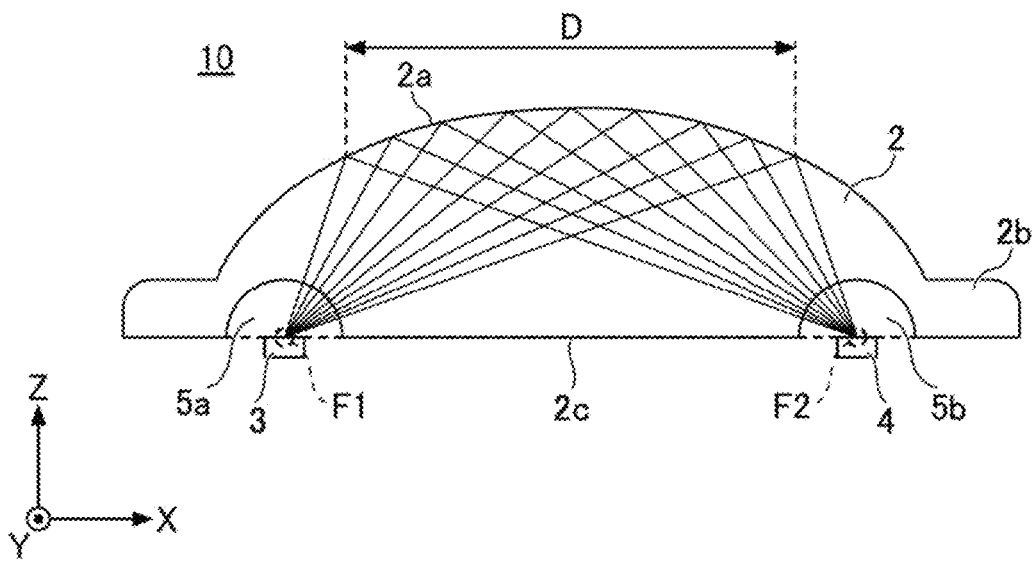
FIG. 5 is a drawing illustrating optical paths of light emitted by a light emitting element and light entering a light receiving element.
Figure 6:
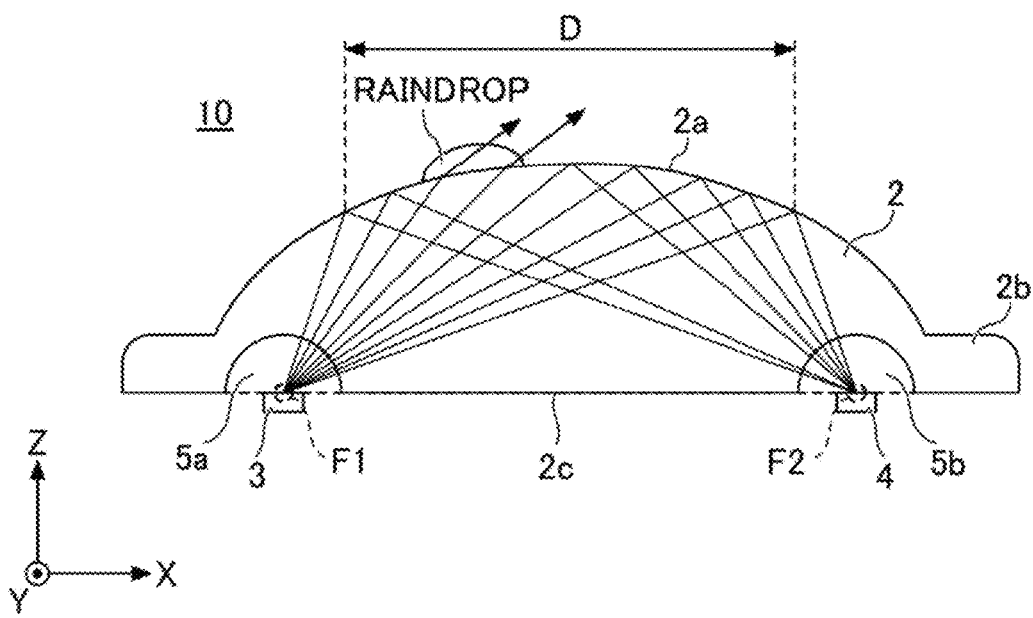
FIG. 6 is a drawing illustrating an example of changes in optical paths caused by a raindrop being adhered to an effective detection area.

FIG. 5 is a drawing illustrating optical paths of light that is emitted by the light emitting element 3 and that enters the light receiving element 4. FIG. 6 is a drawing illustrating changes in the optical paths due to adhesion of a raindrop on the effective detection area D.

As illustrated in FIG. 5, when raindrops are not adhered to the effective detection area D, light that is emitted by the light emitting element 3 and that enters the effective detection area D is totally reflected and guided to the light receiving element 4. As illustrated in FIG. 6, upon a raindrop adhering to the effective detection area D, the reflectance changes because the total reflection condition is not satisfied at the interface of the effective detection area D at a portion where the raindrop adheres, so that the incident light from the light emitting element 3 is almost transmitted. Thus, the amount of light received by the light receiving element 4 is reduced. The presence and amount of raindrops can be detected by monitoring the change in the amount of light received by the light receiving element 4 by using a monitoring circuit that monitors an output of the light receiving element 4.

Figure 7:
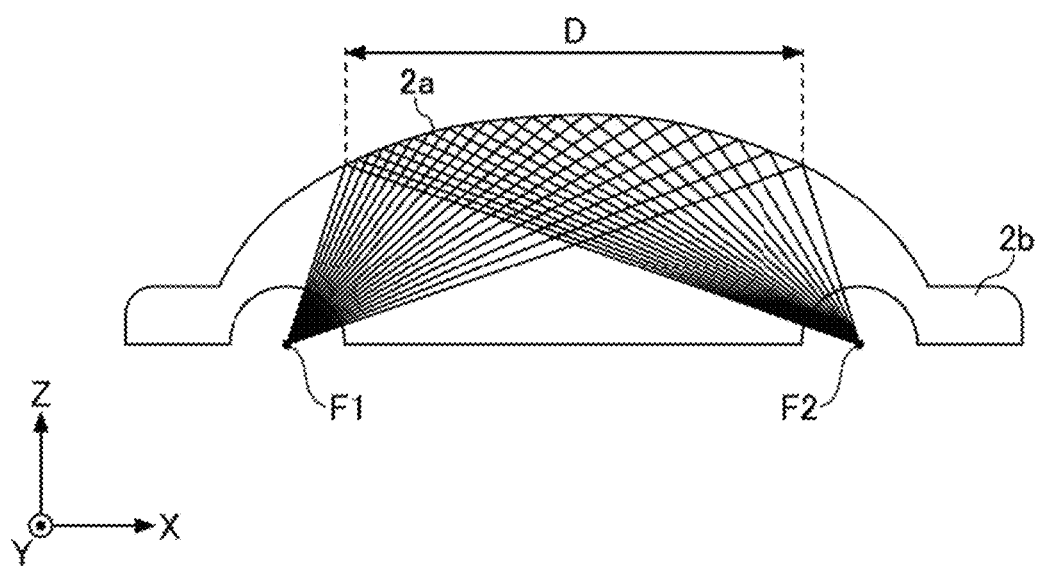
FIG. 7 is a drawing of a simulation of optical paths when an emission profile of the light emitting element is homogeneous.

FIG. 7 is a drawing of a simulation of optical paths when the emission profile of the light emitting element 3 is homogeneous (isotropic). In FIG. 7, equally spaced angle rays represent that the emitting profile homogeneously emits light from the light emitting element 3, and represent the optical paths until the light is received by the light receiving element 4.

Figure 8A:
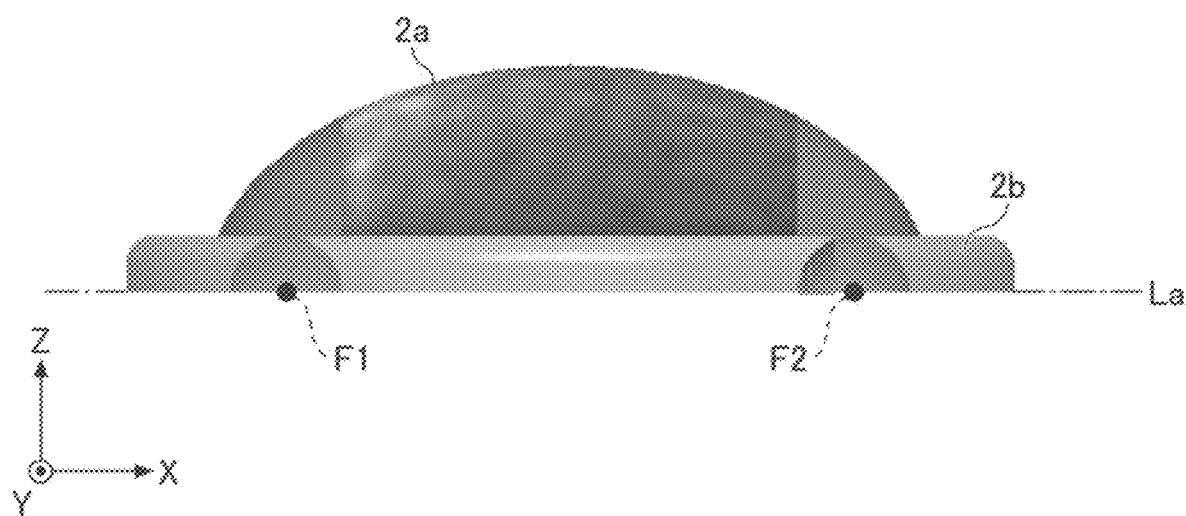
FIG. 8A and FIG. 8B are drawings representing a simulation result illustrated in FIG. 7 as an irradiance distribution on the effective detection area obtained from light components received by the light receiving element.
Figure 8B:
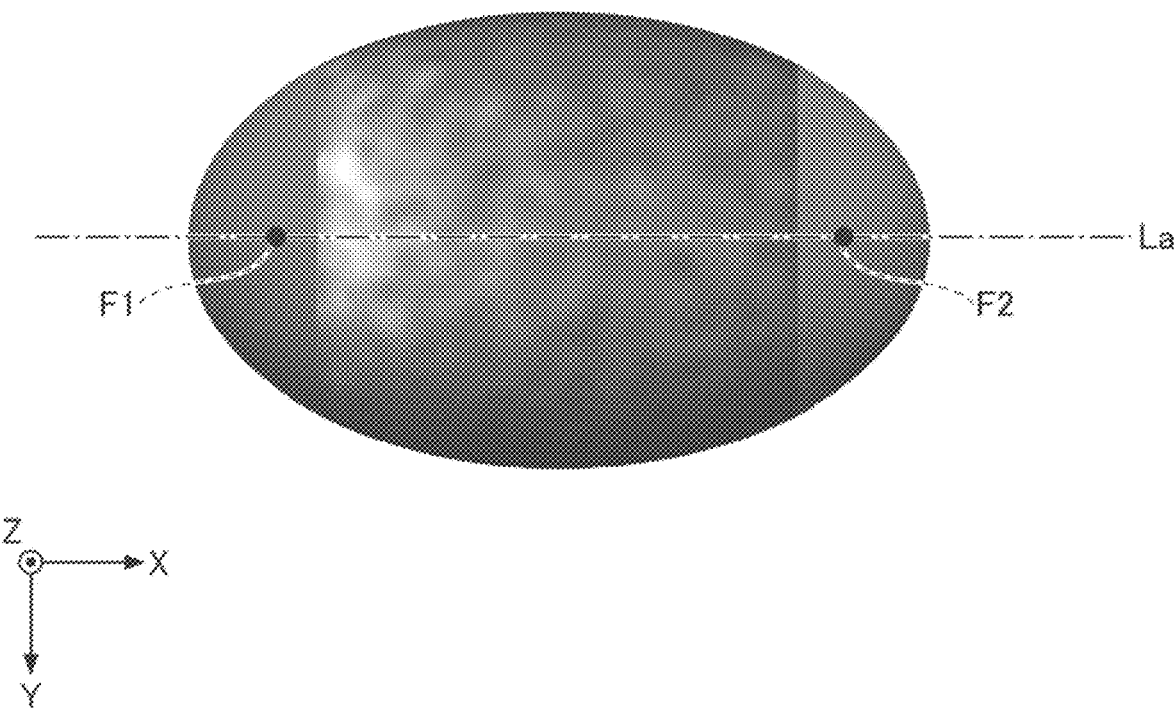

FIG. 8A and FIG. 8B are drawings representing a simulation result illustrated in FIG. 7 as the irradiance on the effective detection area D. FIG. 8A is a side view and FIG. 8B is a plan view. In FIG. 8A and FIG. 8B, the irradiance is represented by a contrasting density, indicating that a region closer to white has a higher irradiance. The radiance distribution is a radiance distribution represented by only light components of the light that is emitted by the light receiving element 4, that is reflected by the effective detection area D, and that is received by the light receiving element 4 when the optical cover 2 is surrounded by air. The contrasting density of the irradiance is patchy, but it depends on the condition of the number of rays set at the simulation. By simulating a condition close to the condition of the actual operating environment, such as increasing the number of rays, patches are reduced and the contrasting density becomes smooth.

As illustrated in FIG. 7, when the emission profile of the light emitting element 3 is homogeneous (i.e., the light emitted by the light emitting element 3 has less angular dependence), the light beam density in the effective detection area D increases as the light emitting element 3 is closer (i.e., as the first focal point F1 is closer) in the XY plane. This corresponds to the irradiance being inversely proportional to the square of the distance, and as illustrated in FIG. 8A and FIG. 8B, the irradiance increases as the light emitting element 3 is closer (i.e., as the first focal point F1 is closer).

As described above, the irradiance also varies depending on the angle at which light enters the detection surface, but the effect of the distance is dominant. More specifically, because the detection surface of the droplet sensor of the present embodiment has a spheroid, the distance from the light source to a region of the effective detection area far from the light source is about 2.8 times larger than the distance from the light source to a region of the effective detection area close to the light source, and a difference in the irradiance in a plane perpendicular to the light is 7.8 times. With respect to this, the incident angle from the light source to the effective detection surface is 51.4° at the top of the minor axis, which is the largest, and decreases as the tops of the major axis on both sides are closer. The minimum incident angle at ends of the effective detection area is 44.3°, and a difference caused by this effect in the irradiance is 1.15 times.

According to FIGS. 8A and 8B, when the irradiance in the effective detection area D is compared in the plane perpendicular to the La axis, the irradiance decreases as the flange 2b is closer (i.e., far from the major axis La in the Y direction). This is because the light receiving surface of the light receiving element 4 is parallel to the XY plane and faces toward the +Z direction.

In the present embodiment, the reason why the light receiving surface faces in the +Z direction is that the purpose is to collect information about changes obtained when rain droplets adhere from the upper direction (i.e., the vertical direction) in preference to information obtained when raindrops adhere from the side direction because the amount of raindrops that are fallen and adhered to the effective detection area D from the upper direction (i.e., the vertical direction) is large and the amount of raindrops that adhere from the side is small. When it is desired to have a uniform sensitivity in the plane perpendicular to the major axis, for example, the light receiving surface of the light receiving element 4 may be disposed to face toward the −X direction.

Next, the interface between the second space 5b and the optical cover 2 will be described.

Figure 9:
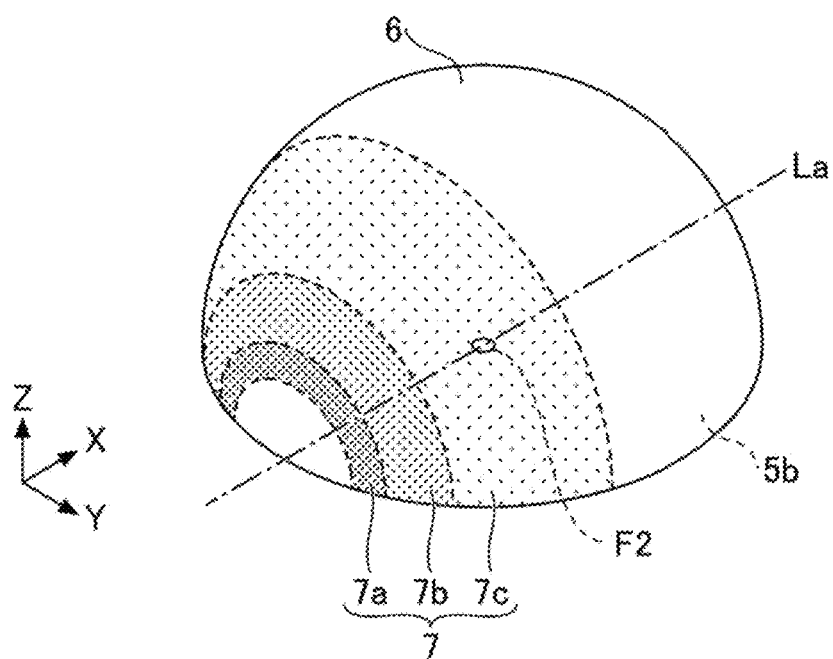
FIG. 9 is a perspective view illustrating a boundary between a second space and the optical cover.

FIG. 9 is a perspective view illustrating an interface 6 between the second space 5b and the optical cover 2. As illustrated in FIG. 9, the hemispherical interface 6 has a transmission scattering surface 7 that scatters incident light. In the present embodiment, an area other than the transmission scattering surface 7 in the interface 6 is the transmission specular surface, but may be the transmission scattering surface. Alternatively, other surface treatments may be applied.

The transmission scattering surface 7 is what is called a sand surface having a microscopic irregular structure. Multiple areas having different surface roughness are formed in the transmission scattering surface 7. In the present embodiment, the transmission scattering surface 7 includes a first region 7a, a second region 7b, and a third region 7c.

The first region 7a, the second region 7b, and the third region 7c are regions of rotational symmetry having the major axis La as the rotational axis. The surface roughness is the largest in the first region 7a and the smallest in the third region 7c.

Figure 10:
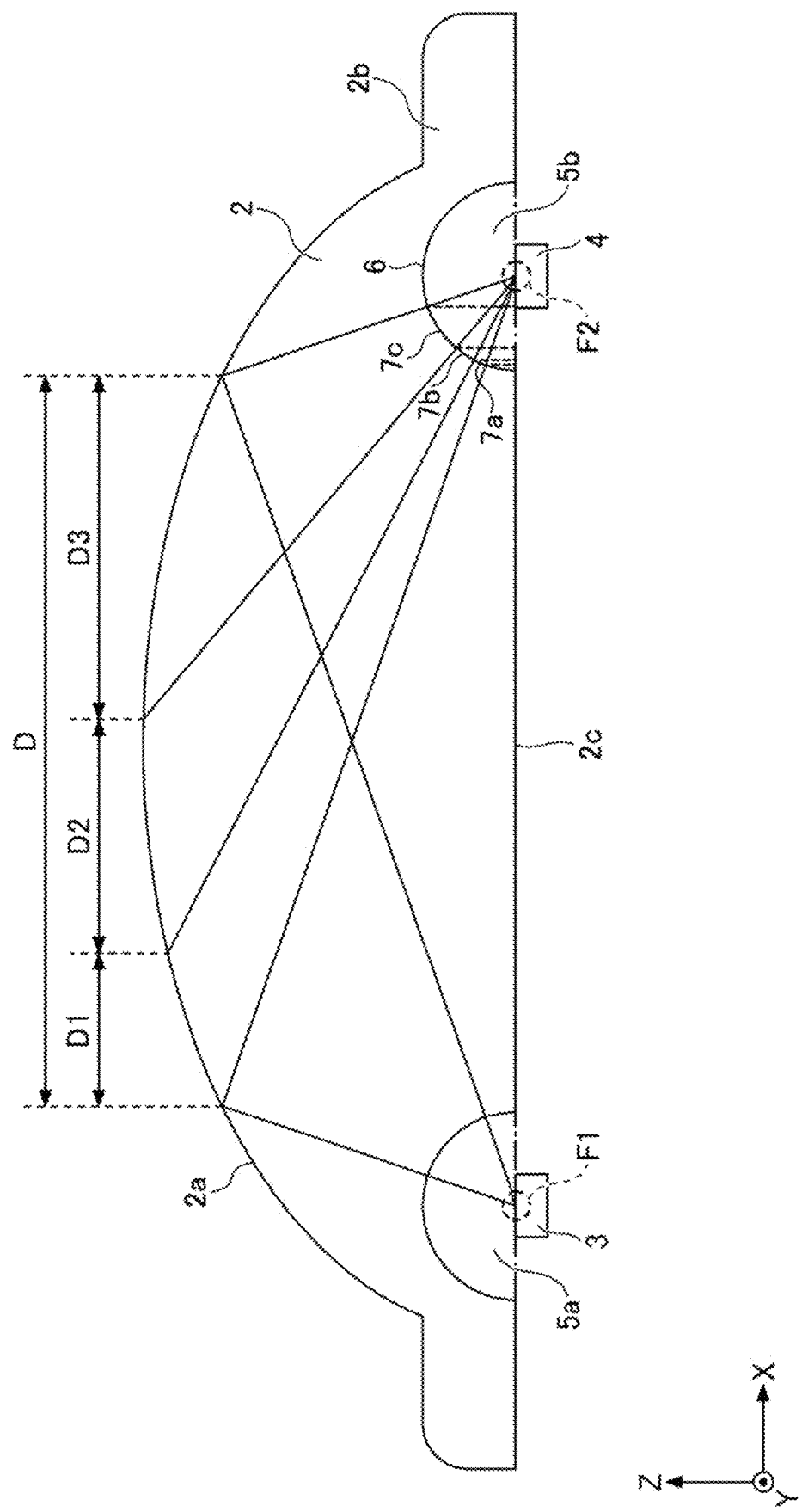
FIG. 10 is a drawing illustrating a relation between a transmission scattering surface and the effective detection area.

FIG. 10 is a drawing illustrating a relation between the transmission scattering surface 7 and the effective detection area D. As illustrated in FIG. 10, in the present embodiment, the first region 7a of the transmission scattering surface 7 corresponds to a first detection area D1, the second region 7b corresponds to a second detection area D2, and the third region 7c corresponds to a third detection area D3. The first detection area D1, the second detection area D2, and the third detection area D3 are areas of rotational symmetry having the major axis La as the rotational axis.

With respect to the distance from the light emitting element 3, the first detection area D1 is the closest and the third detection area D3 is the farthest. Thus, the irradiance is reduced in the order of the first detection area D1, the second detection area D2, and the third detection area D3 (see FIG. 8A and FIG. 8B).

The first region 7a is a region receiving light that is emitted by the light emitting element 3 and that is reflected by the first detection area D1. The second region 7b is a region receiving light that is emitted by the light emitting element 3 and that is reflected by the second detection area D2. The third region 7c is a region receiving light that is emitted by the light emitting element 3 and that is reflected by the third detection area D3.

Light entering the transmission scattering surface 7 from the effective detection area D is scattered by the transmission scattering surface 7 at transmission, so that the emission angle (i.e., the scattering angle) is dispersed according to the surface roughness, and the central intensity decreases. The amount of reduction in the central intensity of the transmitted scattered light increases as the surface roughness in the transmission scattering surface 7 increases.

Figure 11:
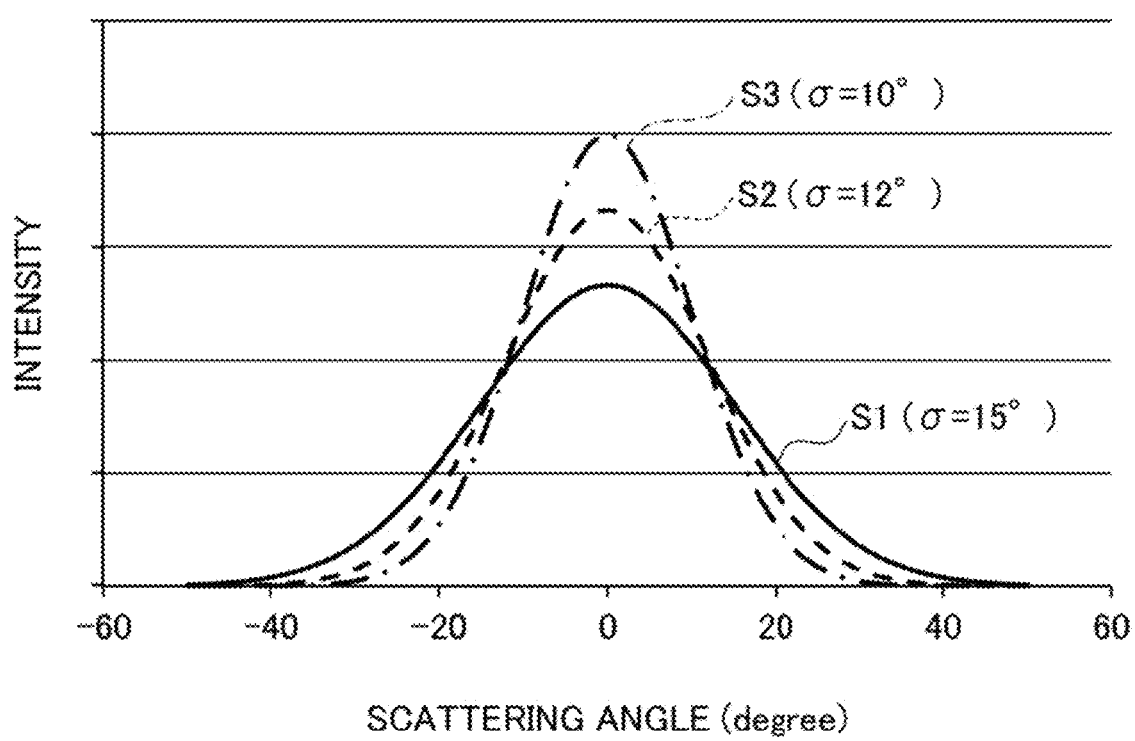
FIG. 11 is a graph illustrating an example of an intensity distribution when a reflected light passes through each area of the transmission scattering surface.

FIG. 11 is a graph illustrating the intensity distribution when reflected light passes through each region of the transmission scattering surface 7. The scattering angle of light scattered by the sand surface depends on the surface roughness, but the profile of the scattered light often has a property similar to the Gaussian distribution (i.e., the normal distribution). Thus, the description assumes that the scattered light follows the Gaussian distribution.

In FIG. 11, S1, S2, and S3 respectively correspond to the first region 7a, the second region 7b, and the third region 7c, and indicate relative values of the intensity distribution (i.e., the irradiance) at scattering occurred when the same amount of light enter each region. The surface roughness of the first region 7a, the second region 7b, and the third region 7c is configured, such that, for example, a standard deviation σ of the scattering angle is 15°, 12°, and 10° in order. Thus, an action of lowering the central intensity of the transmitted scattered light is the largest in the first region 7a and the smallest in the third region 7c.

As a result of the above-described configuration, the light from the first detection area D1 having the largest irradiance enters the light receiving element 4 with the central intensity being significantly reduced in the first region 7a. With respect to this, the light from the third detection area D3 having the smallest irradiance enters the light receiving element 4 with the central intensity being reduced in the third region 7c, but the amount of decrease in the central intensity of the light from the third detection area D3 is smaller than the amount of decrease in the central intensity of the light from the first detection area D1.

As described above, because with respect to the light from the effective detection area D, the central intensity of light from the detection area where the irradiance is larger is more reduced by passing through the transmission scattering surface 7, a difference in the irradiance occurring on the detection surface of the light receiving element 4 is cancelled on the light receiving element 4 after passing through the transmission scattering surface 7, and the area dependence of the amount of light received by the light receiving element 4 is reduced. This causes the droplet detection sensitivity to be uniform with respect to the detection surface along the major axis (e.g., the detection surface on the XZ plane including the major axis La).

Figure 12A:
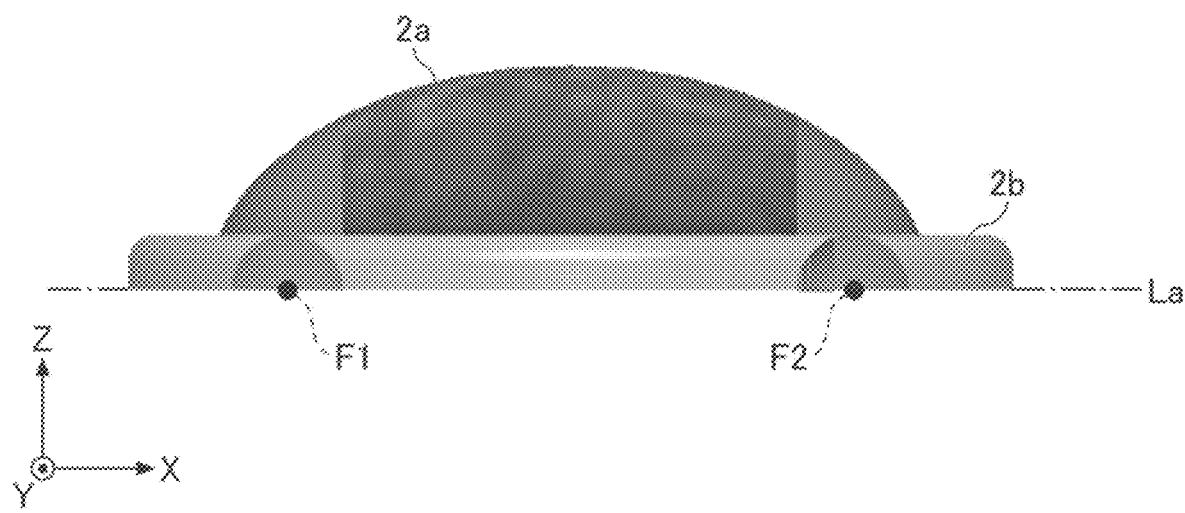
FIG. 12A and FIG. 12B are drawings illustrating a simulation result of an irradiance distribution on the effective detection area obtained from light components received by the light receiving element when the transmission scattering surface having the intensity distribution illustrated in FIG. 11 is applied to a boundary surface of the second space.
Figure 12B:
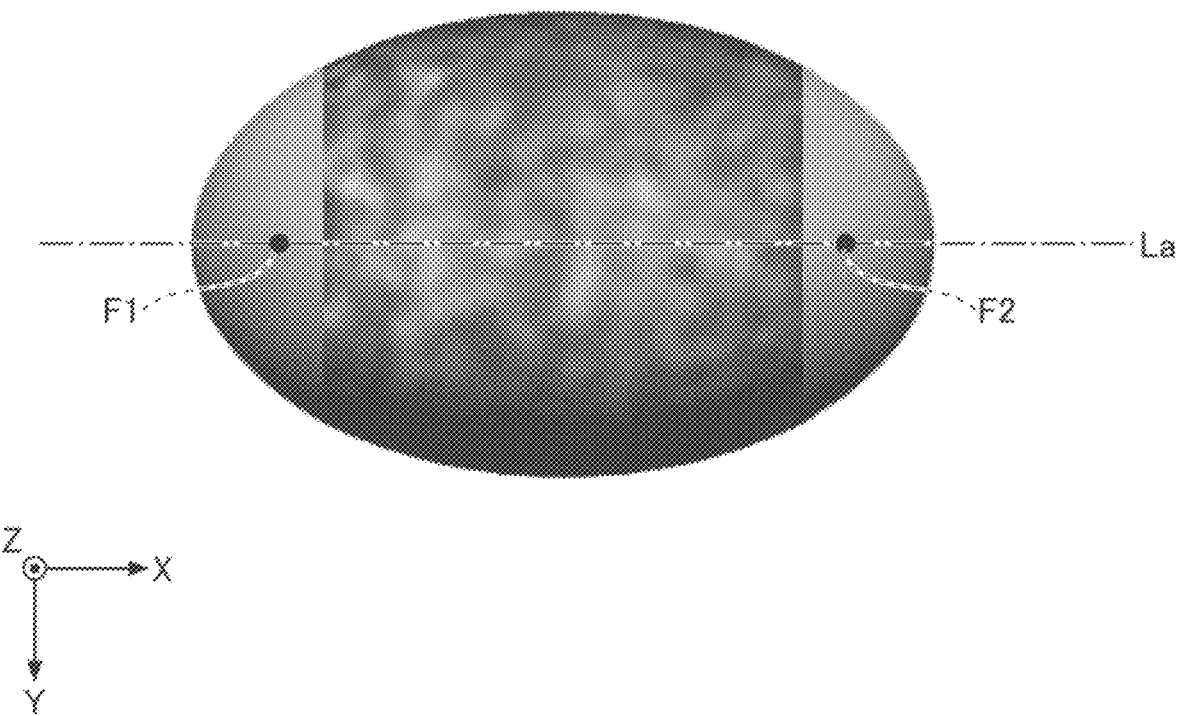

FIG. 12A and FIG. 12B are drawings illustrating a simulation result of the irradiance on the detection surface obtained by light components received by the light receiving element 4 when the transmission scattering surface having the intensity distribution illustrated in FIG. 11 is applied to the interface of the second space. FIG. 12A is a side view and FIG. 12B is a plan view. When FIG. 12A and FIG. 12B are compared with FIG. 8A and FIG. 8B, the droplet detection sensitivity along the major axis is uniformized by the action of the transmission scattering surface 7.

In the above-described embodiment, the transmission scattering surface 7 is divided into three regions with different surface roughness. However, the number of divisions is not limited to three, and the number of divisions and the size of each area can be appropriately changed.

In the present embodiment, the description assumes raindrops fall vertically (from the upper direction), and the sensitivity uniformization along the major axis direction, which is considered to achieve that the information about adhesion of raindrops can be efficiently collected, has been described. But, by setting the change in surface roughness in the ±Y direction, the sensitivity can also be uniform or controlled in the minor axis direction (i.e., ±Y direction). However, in this case, since the light receiving surface of the light receiving element 4 is disposed to the +Z direction, the light receiving efficiency for light having the incident angle to the light receiving surface close to 90 degrees is extremely low, and it should be noted that it is difficult to achieve uniformity by adjusting the scattering surface. A detection surface that hardly contributes to the collection of the information about adhesion of raindrops, in which, for example, the incident angle to the light receiving surface is close to 90 degrees, may be preliminarily removed from the detection surface by, for example, providing a light shielding coating or increasing the height of the flange, and may be used as a member for fixing the cover.

As described above, by achieving the light emitting element 3 having a uniform emission profile (that is, the angle dependence of the light emitted by the light emitting element 3 is small), even if the angle of the intensity center is shifted in the up, down, left, or right direction with respect to the major axis La, a change in the emission profile of the light emitting element 3 for entering the effective detection area D caused by the angle shift is small, so that the detection error can be suppressed.

Modified Example

Next, a modified example of the above-described embodiment will be described.

Figure 13:
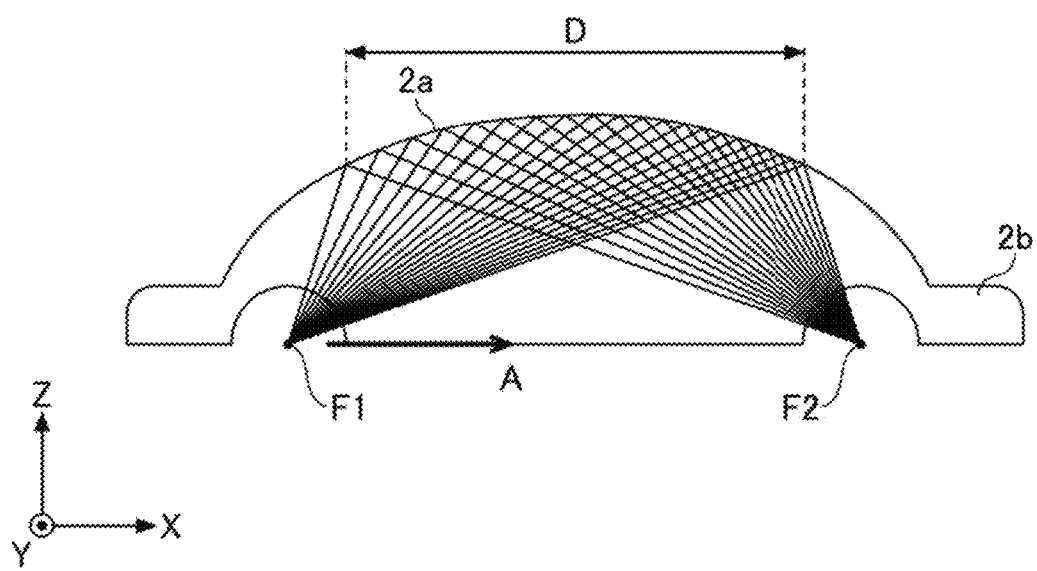
FIG. 13 is a drawing of a simulation of optical paths when an emission profile of the light emitting element has extremely high directivity.

FIG. 13 is a drawing of a simulation of optical paths when the emission profile of the light emitting element 3 has a significantly strong directivity. Specifically, in FIG. 13, the emitting angle of the light emitting element 3 is narrowed, and an emitting direction of the light from the light emitting element 3 is directed parallel to the major axis La and directed to the second focal point F2, as indicated by an arrow A. FIG. 13 illustrates optical path of the light emitted by the light emitting element 3 and received by the light receiving element 4. When the emission profile of the light emitting element 3 has a significantly strong directivity, the light beam density in the effective detection area D increases as the light emitting element 3 is closer (i.e., the second focal point F2 is closer) viewed from the XZ plane.

Figure 14A:
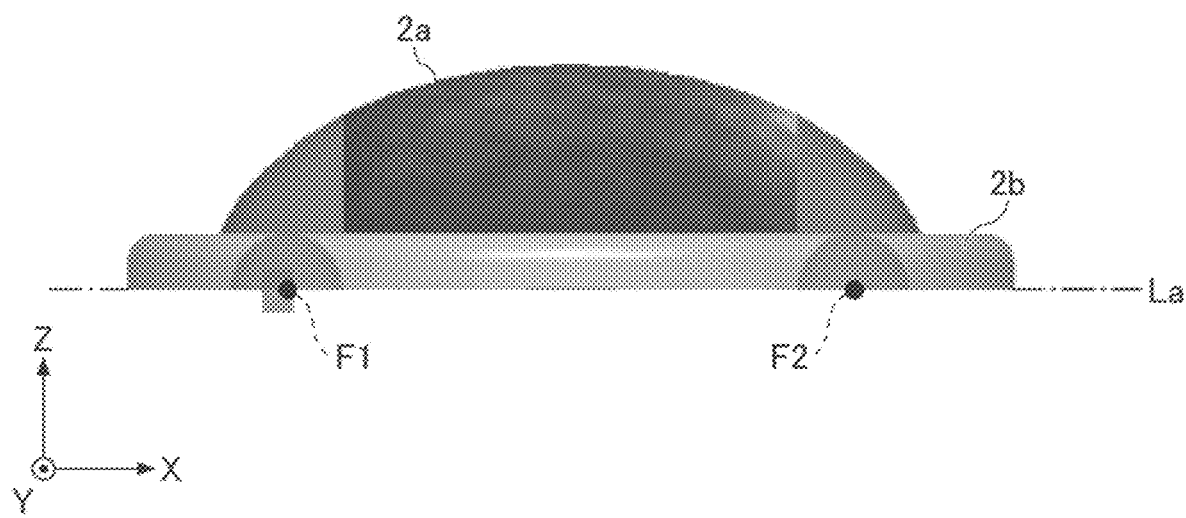
FIG. 14A and FIG. 14B are drawings representing a simulation result illustrated in FIG. 13 as an irradiance distribution on the effective detection area obtained from light components received by the light receiving element.
Figure 14B:
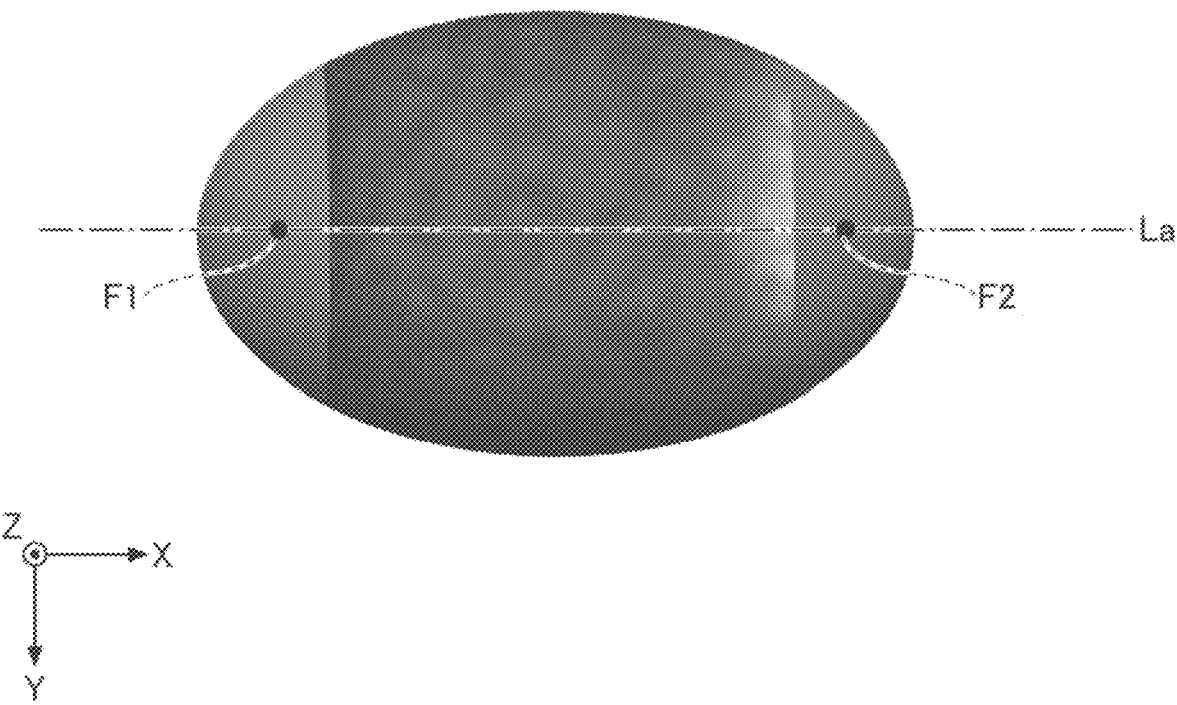

FIG. 14A and FIG. 14B are drawings illustrating a simulation result illustrated in FIG. 13 as the irradiance of the effective detection area D. FIG. 14A is a side view and FIG. 14B is a plan view. In FIG. 12A and FIG. 12B, the irradiance is represented by the contrasting density, indicating that a region closer to white has a higher irradiance. The irradiance is irradiance on the effective detection area D for the light that is emitted by the light emitting element 3, reflected by the effective detection area D, and received by the light receiving element 4.

As illustrated in FIG. 14A and FIG. 14B, when the emission profile of the light emitting element 3 has a significantly strong directivity, the central intensity of the light emitting element 3 is significantly large, so that the light beam density in the effective detection area D increases along the major axis La in the detection area far from the light emitting element 3. In this case, as illustrated in FIG. 14A and FIG. 14B, along the major axis La, the irradiance in the detection area far from the light emitting element 3 is higher than the irradiance in the detection area close to the light emitting element 3.

Figure 15:
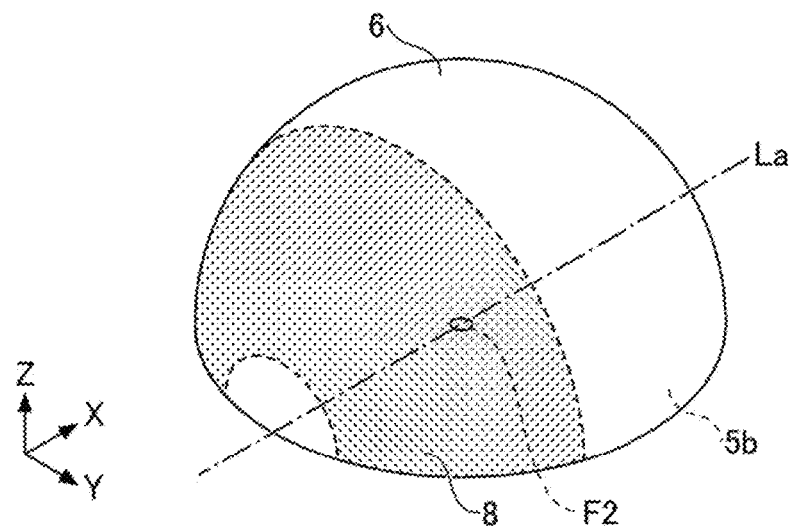
FIG. 15 is a perspective view illustrating a boundary between a second space and an optical cover according to a modified example.

FIG. 15 is a perspective view illustrating the interface 6 between the second space 5b and the optical cover 2 according to the modified example. As illustrated in FIG. 15, in the modified example, a transmission scattering surface 8 for scattering incident light is formed in the interface 6. An area other than the transmission scattering surface 8 in the interfaces 6 is the transmission specular surface, but may be the transmission scattering surface. Alternatively, another surface treatment may be applied.

As in the above-described embodiment, the transmission scattering surface 8 is formed of multiple transmission scattering surfaces having different surface roughness, so that the detection sensitivity can be uniform, but in the modified example, as illustrated in FIG. 15, the surface roughness of the transmission scattering surface 8 is homogeneous. The transmission scattering surface 8 is an area which the light that is emitted by the light emitting element 3 and that is reflected by the effective detection area D enters. The intensity distribution of the transmitted scattered light transmitted through the transmission scattering surface 8 is, for example, an intensity distribution S3 illustrated in FIG. 11.

Figure 16:
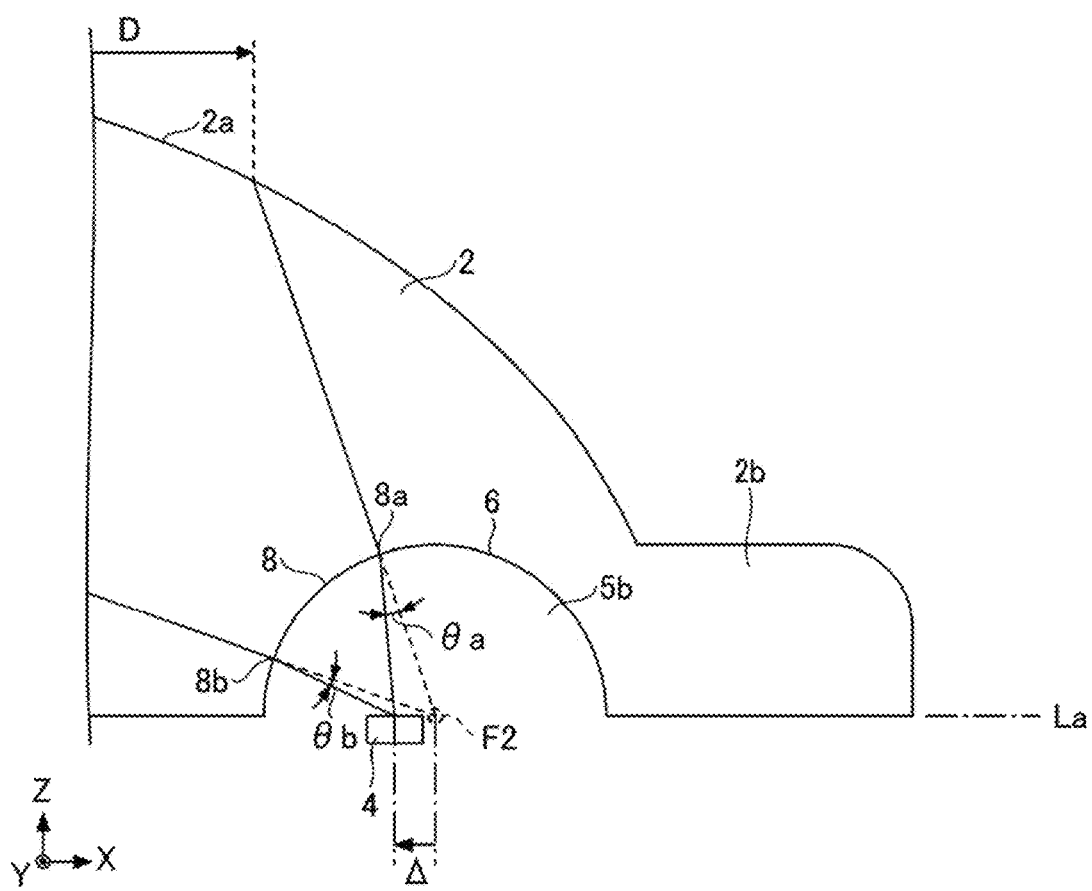
FIG. 16 is a drawing illustrating a positional relation of the light receiving element with respect to a second focal point according to a modified example.

FIG. 16 is a drawing illustrating a positional relation of the light receiving element 4 according to the modified example with respect to the second focal point F2. In the modified example, as illustrated in FIG. 16, a position of the light receiving element 4 is displaced in the −X direction along the major axis La from the second focal point F2. In FIG. 16, Δ represents the amount of displacement.

As in the above-described embodiment, when the light receiving element 4 is disposed at the second focal point F2, the light receiving element 4 mainly receives light with a scattering angle of 0° among transmitted scattered light transmitted through the transmission scattering surface 8. However, the light receiving element 4 is displaced from the second focal point F2, so that the light receiving element 4 mainly receives light with a scattering angle other than 0°.

As described, when the light receiving element 4 is displaced from the second focal point F2, the scattering angle of the transmitted scattered light received by the light receiving element 4 varies depending on a position at which the reflected light from the effective detection area D is transmitted through the transmission scattering surface 8. As illustrated in FIG. 16, when the light receiving element 4 is displaced from the second focal point F2, with respect to the transmitted scattered light transmitted through an upper end 8a of the transmission scattering surface 8, light with the scattering angle around θa is selectively received by the light receiving element 4, and with respect to the transmitted scattered light transmitted through a lower end 8b of the transmission scattering surface 8, light with the scattering angle around θb is selectively received by the light receiving element 4 where θa>θb.

Figure 17:
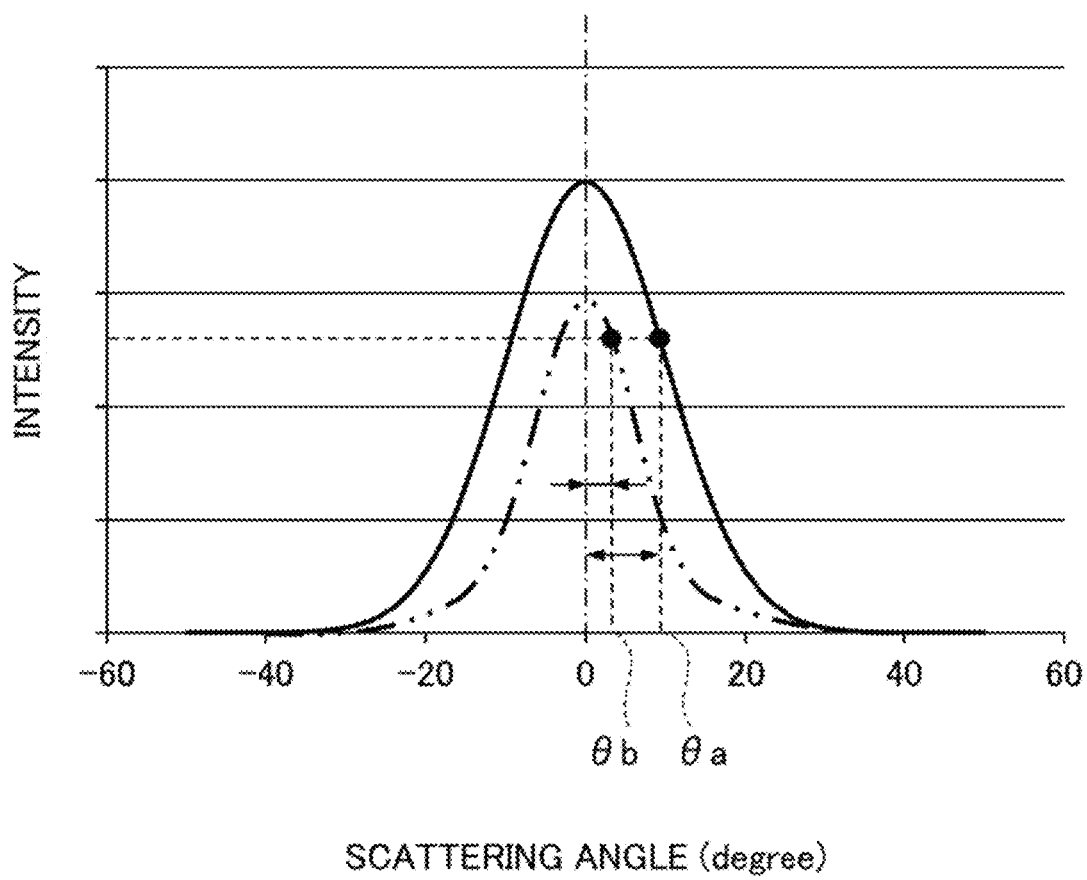
FIG. 17 is a graph illustrating an example of an intensity distribution of transmission scattering light passing through the transmission scattering surface.

FIG. 17 is a graph illustrating the intensity distribution of the transmitted scattered light transmitted through the transmission scattering surface 8. In FIG. 17, the solid line indicates the intensity of light incident from the upper end 8a, and the double-dotted line indicates the intensity of light incident from the lower end 8b. As illustrated in FIG. 17, because θa>θb, the intensity of light having about the scattering angle θa is smaller than the intensity of light having about the scattering angle θb. Therefore, the intensity of the light received by the light receiving element 4 decreases as the scattering angle increases, that is, a transmission area in the transmission scattering surface 8 is closer to the upper end 8a.

As described above, in the modified example, the irradiance in the effective detection area D increases as the light emitting element 3 is away. Thus, in the modified example, light from an area having a high irradiance is transmitted through a region close to the upper end 8a of the transmission scattering surface 8, and the intensity of light received by the light emitting element 3 decreases. Therefore, the difference in the irradiance on the effective detection area D is cancelled, and the droplet detection sensitivity becomes uniform.

Figure 18A:
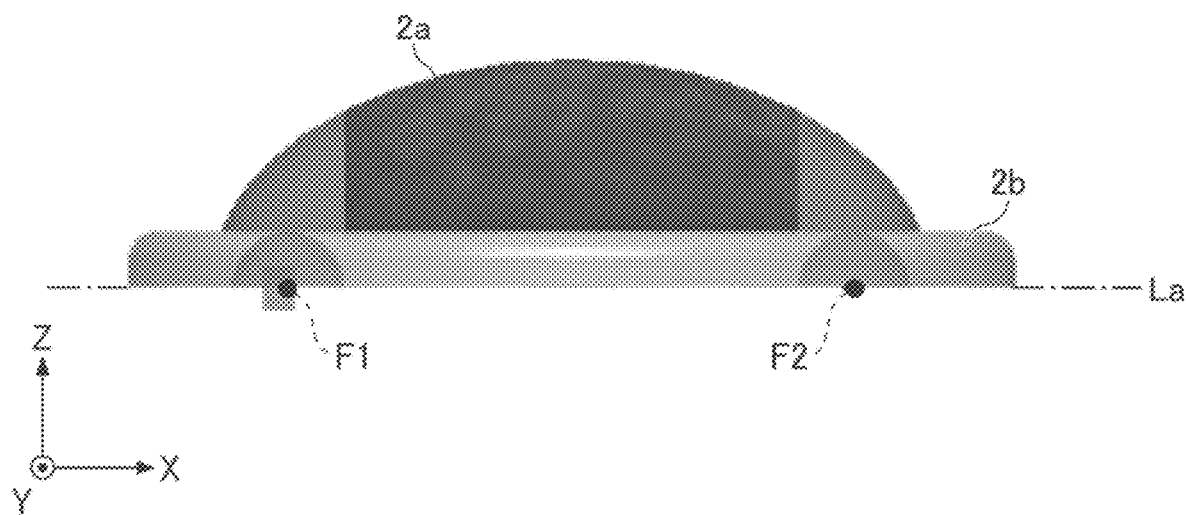
FIG. 18A and FIG. 18B are drawings illustrating a simulation result of an irradiance distribution on the effective detection area obtained from light components received by the light receiving element when effects of the transmission scattering surface and a light receiving element are considered.
Figure 18B:
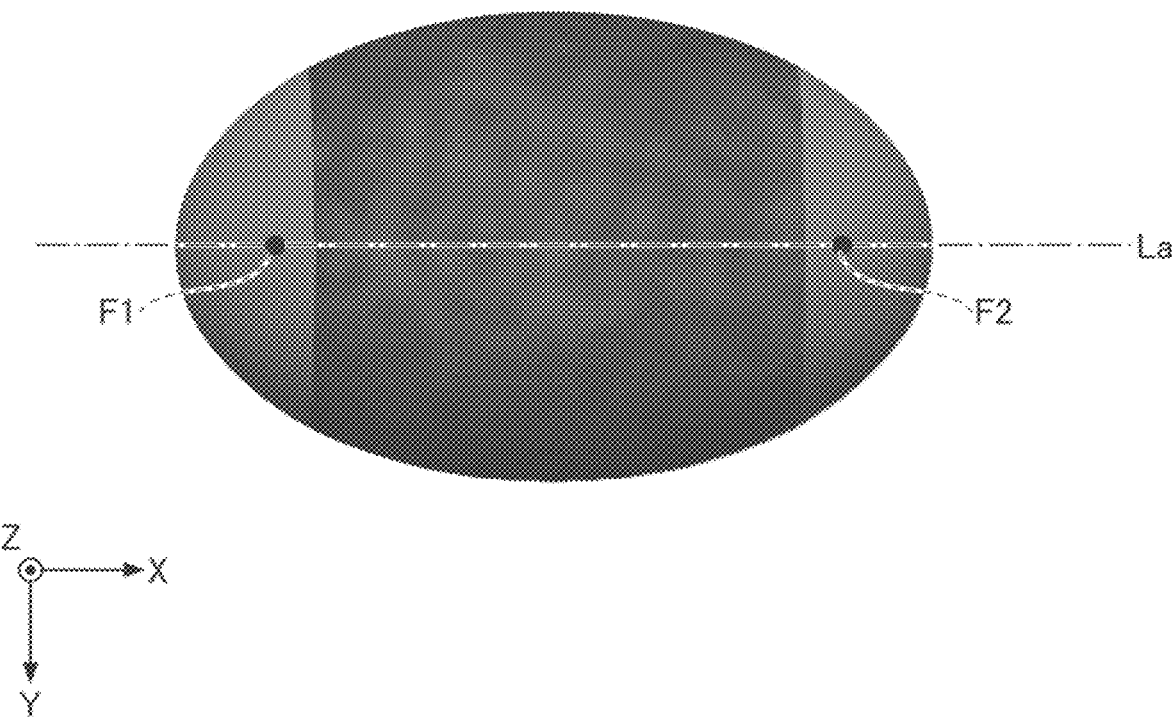

FIG. 18A and FIG. 18B are drawings illustrating a simulation result of the irradiance in consideration of actions of the transmission scattering surface 8 and the light receiving element 4. FIG. 18A is a side view and FIG. 18B is a plan view. Thus, when FIG. 18A and FIG. 18B are compared with FIG. 14A and FIG. 14B, the droplet detection sensitivity is uniformized by the actions of the transmission scattering surface 8 and the light receiving element 4.

In FIG. 16, the light receiving element 4 is displaced in the −X direction with respect to the second focal point F2, but may be displaced in the +X direction. In contrast to the modified example, when the irradiance on the left side of the detection surface is larger than the irradiance on the right side, the sensitivity can be uniformized by displacing the light receiving element 4 in the ±Z direction.

In the droplet sensor according to the present invention, the light emitting element 3 and the light receiving element 4 are respectively disposed at or in proximity to the first and second focal points F1 and F2. However, it is necessary to adjust the positions optimal in consideration of the shape and size of a light emitting part of the light emitting element 3, the emission profile, and the shape and size of a light receiving part of the light receiving element 4, and it is preferable to dispose the light emitting element 3 and the light receiving element 4 respectively so as to have the uniform sensitivity characteristics or permit control of the sensitivity characteristics on the effective detection area D as much as possible.

The droplet sensor according to the present invention can also be applied to a rain sensor, a condensation sensor, or the like. The rain sensor can be installed on, for example, a street tree, or a street lamp to measure local rainfall distribution, to collect weather information, or to control a wiper of a vehicle. The condensation sensor can be used in office automation equipment such as copiers and server devices. In addition, the rain sensor can be incorporated into the environmental sensor and used in combination with another sensor (such as a temperature sensor and an air flow rate sensor).

What is claimed is:
1. A droplet sensor comprising:
an optical cover having an ellipsoid surface that is a portion of a spheroid;
a light source disposed at or in proximity to a first focal point of the ellipsoid surface; and
a light detector disposed at or in proximity to a second focal point of the ellipsoid surface,
wherein the ellipsoid surface includes an effective detection area configured to reflect light emitted by the light source toward the light detector, and an amount of light reflected by the effective detection area changes in accordance with adhesion of droplets on the ellipsoid surface,
wherein the optical cover includes a space having a hemispherical surface, the space being centered at the second focal point,
wherein the hemispherical surface includes a transmission scattering surface on a region that receives the light reflected by the effective detection area, the transmission scattering surface including designed irregularities, and allowing the light to pass through the transmission scattering surface with scattering, and
wherein the transmission scattering surface includes a plurality of regions, each region of the plurality of regions having different surface roughness and having rotational symmetry about a major axis of the ellipsoid surface as a rotational axis.

2. The droplet sensor as claimed in claim 1, wherein the plurality of regions include a first region that receives light reflected by a first area in the effective detection area and a second region that receives light reflected by a second area in the effective detection area, irradiance of the second area being larger than irradiance of the first area, and surface roughness of the second region is greater than surface roughness of the first region.

3. The droplet sensor as claimed in claim 1, wherein the light detector is disposed at a position displaced from the second focal point along a major axis or a minor axis of the ellipsoid surface.

4. The droplet sensor as claimed in claim 1, wherein the hemispherical surface includes a transmission specular surface on a region other than the transmission scattering surface.

5. The droplet sensor as claimed in claim 1, wherein a shape of the optical cover is obtained by cutting the spheroid along a plane including a major axis of the spheroid.

6. A droplet sensor comprising:
an optical cover having an ellipsoid surface that is a portion of a spheroid;

a light source disposed at or in proximity to a first focal point of the ellipsoid surface; and a light detector disposed at or in proximity to a second focal point of the ellipsoid surface, wherein the ellipsoid surface includes an effective detection area configured to reflect light emitted by the light source toward the light detector, and an amount of light reflected by the effective detection area changes in accordance with adhesion of droplets on the ellipsoid surface, wherein the optical cover includes a space having a hemispherical surface, the space being centered at the second focal point, wherein the hemispherical surface includes a transmission scattering surface on a region that receives the light reflected by the effective detection area, the transmission scattering surface including a plurality of regions, and each region of the plurality of regions having different surface roughness, and wherein each region of the plurality of regions has rotational symmetry about a major axis of the ellipsoid surface as a rotational axis.

* * * * *